(12) United States Patent
Robbins et al.

(10) Patent No.: US 10,736,334 B2
(45) Date of Patent: Aug. 11, 2020

(54) HARD PANNED COATING AND CONFECTION COMPRISING THE SAME

(71) Applicants: MARS, INCORPORATED, McLean, VA (US); WM. WRIGLEY JR. COMPANY, Chicago, IL (US)

(72) Inventors: Rebecca J. Robbins, Hackettstown, NJ (US); Barbara Stawski, Chicago, IL (US); Thomas M. Collins, Hackettstown, NJ (US)

(73) Assignee: MARS, INCORPORATED, Chicago, IL (US)

(*) Notice: Subject to any disclaimer, the term of this patent is extended or adjusted under 35 U.S.C. 154(b) by 382 days.

(21) Appl. No.: 14/776,464

(22) PCT Filed: Mar. 11, 2014

(86) PCT No.: PCT/US2014/023264
§ 371 (c)(1),
(2) Date: Sep. 14, 2015

(87) PCT Pub. No.: WO2014/150438
PCT Pub. Date: Sep. 25, 2014

(65) Prior Publication Data
US 2016/0029657 A1     Feb. 4, 2016

Related U.S. Application Data

(60) Provisional application No. 61/787,086, filed on Mar. 15, 2013.

(51) Int. Cl.
| | | |
|---|---|---|
| *A23G 3/54* | (2006.01) | |
| *A23G 3/34* | (2006.01) | |
| *A23G 4/06* | (2006.01) | |
| *A23G 4/20* | (2006.01) | |
| *A23G 3/42* | (2006.01) | |

(52) U.S. Cl.
CPC ............ *A23G 3/54* (2013.01); *A23G 3/0095* (2013.01); *A23G 3/343* (2013.01); *A23G 3/42* (2013.01); *A23G 4/062* (2013.01); *A23G 4/20* (2013.01); *A23V 2002/00* (2013.01)

(58) Field of Classification Search
CPC ................. A23G 3/0095; A23G 3/54
USPC ........................................ 426/103
See application file for complete search history.

(56) References Cited

U.S. PATENT DOCUMENTS

| | | | |
|---|---|---|---|
| 2,591,704 A | 4/1952 | King | |
| 3,476,598 A | 11/1969 | Sanders | |
| 3,639,564 A | 2/1972 | Kawata et al. | |
| 4,828,845 A | 5/1989 | Zamudio-Tena et al. | |
| 5,135,761 A | 8/1992 | Dave et al. | |
| 2004/0103821 A1 | 6/2004 | Shobu et al. | |
| 2008/0026131 A1* | 1/2008 | Benjamin | A23G 1/54 426/660 |
| 2008/0166449 A1* | 7/2008 | Kabse | A23G 3/0065 426/5 |
| 2011/0129563 A1 | 6/2011 | Ashokan et al. | |
| 2011/0287060 A1* | 11/2011 | Gonze | A23G 3/0095 424/400 |

FOREIGN PATENT DOCUMENTS

| | | | | |
|---|---|---|---|---|
| EP | 1013074 A1 * | 6/2000 | ........... | H04N 1/1215 |
| FR | 2464656 | 3/1981 | | |
| JP | 57012957 A | 1/1982 | | |
| RU | 2305947 C2 | 9/2007 | | |
| WO | 2004080191 | 9/2004 | | |
| WO | 2009036954 | 3/2009 | | |
| WO | WO 2009036954 A1 * | 3/2009 | ........... | A23G 3/0095 |
| WO | 2012059590 | 5/2012 | | |
| WO | WO 2012059590 A1 * | 5/2012 | ............... | A23L 2/58 |
| WO | 2014150438 | 9/2014 | | |

OTHER PUBLICATIONS

Sucrose esters—Sisterna : Food | Personal care | Industrial—1 page (Year: 2011).*
"SISTERNA Sucrose Esters and Sugar Crystallization", Technical Note 730014-03-07.
"SISTERNA Sucrose Esters in Panning Confection", Technical Note 73024-05/08, date unavailable.
Griffin, et al., "Surface Active Agents", in "Handbook of Food Additives", 2nd Edition, vol. 1, CRC Press LLC, 1968, pp. 426, 428.

(Continued)

*Primary Examiner* — Jyoti Chawla

(57) ABSTRACT

There is provided a hard panned coating, and a hard panned confection comprising an edible core coated with the same. The hard panned coating comprises multiple sugar syrup layers, only some of which further comprise one or more sucrose esters. In some embodiments, titanium dioxide may be excluded from the sugar syrup/sucrose ester layers. In these, and other, embodiments, the hard panned coatings exhibit one or more L*, a* and b* values within 5% of the corresponding value of a colorant overcoat applied over a precoat comprising titanium dioxide. Raw material cost savings are thus provided, while yet providing a confection having enhanced properties.

12 Claims, No Drawings

(56) References Cited

OTHER PUBLICATIONS

Knightly, "The Use of Glycerol Monostearate and Related Emulsifiers in Candy", in "Twenty Years of Confectionery and Chocolate Progress" from the Proceedings of the 1947 to 1966 Annual Production Conference of the Manufacturing Confectioners' Associate, The AVI Publishing Company, Inc., 1970, pp. 410, 427-428.
SISTERNA, "Sucrose Esters in Confectionery", www.sisterna.com, available online prior to 12/5/201.
Van Ingen, "Gear Up Your Panning Process with Sucrose Esters of Fatty Acids", Sisterna B.V. Brochure, www.sisterna.com, available online prior to Dec. 5, 2012.

\* cited by examiner

HARD PANNED COATING AND CONFECTION COMPRISING THE SAME

This application is a 371 National Stage filing of International Application Serial No. PCT/US2014/023264 filed Mar. 11, 2014, which claims benefit of U.S. Provisional Patent Application Ser. No. 61/787,086 filed Mar. 15, 2013, both of which are hereby incorporated by reference herein in their entirety.

FIELD

The present invention relates to a hard panned coating and a confection coated with the same.

BACKGROUND

Hard panned confections are enjoyed by consumers for the multisensory consuming experience that they provide. That is, the coating typically provides a different texture and flavor than the underlying confection, and such confections can be provided in a variety of sizes, shapes and colors. Providing such confections in the vast array of possible combinations of shapes, tastes, textures and colors can be challenging. Producing vibrant colors in particular can be difficult, especially when the underlying confection is colored, and even more so when differently colored, than the overlying coating.

Conventionally, titanium dioxide has been utilized in hard panned coatings in order to provide an opaque substrate on which to apply colored layers of the panned coating. The opacity provided to a precoat of titanium dioxide allows the colored layers applied thereover to exhibit a more true color. Other white materials may not provide the same level of opacifying as titanium dioxide and colored layers applied over, e.g., calcium carbonate, are not expected to exhibit the same true color as when the same colored layer(s) is applied over a precoat comprising titanium dioxide.

Although titanium dioxide has enjoyed consumer acceptance for a number of years, alternatives are yet desired that would either be perceived by consumers as being more naturally derived, and/or provide cost savings either in the form of raw materials, or manufacturing efficiencies. Any such alternatives would desirably provide the coating of the hard panned confection with a CIELAB color difference (delta E, or "$\Delta E$")) of 10 or less compared to a coating on the same confection prepared with titanium dioxide. Another predictor of the commercial acceptance, and desirably success, of any such coating would be its ability to exhibit an L*, a* and/or b* within 5% of that of the same coating prepared with titanium dioxide.

BRIEF DESCRIPTION

The present invention provides such a coating. More specifically, the hard panned coating comprises multiple sugar syrup layers, some but not all of which further comprise one or more sucrose esters. Raw material costs savings are thus provided as compared to coatings wherein sucrose esters are included in every sugar syrup layer. In some embodiments, the sucrose ester(s) can act to replace a conventional opacifier in precoat layers of the coating, and further cost savings can be seen. In either, or both, case(s), $\Delta E$ values of 10 or less can be seen between the color characteristics of the inventive confection and conventional confections, i.e., comprising a conventional opacifier. At least one of the CIELAB L*, a* and b* values of at least one coating color variant of the confection may also be within 5% of the corresponding value of the same coating color variant of the same confection comprising titanium dioxide.

In one aspect, a hard panned coating comprising multiple sugar syrup layers is provided. Less than all of the sugar syrup layers comprise an amount of one or more sucrose esters. The sugar desirably comprises a natural sugar, such as sucrose, glucose, fructose, galactose, dextrose, or a combination of these. In some embodiments, the sugar comprises sucrose. The sucrose ester can act as a replacement for conventional opacifiers, and so, in some embodiments, the hard panned coating does not comprise titanium dioxide in some or all of the sugar syrup layers. In other embodiments the hard panned coating does not comprise titanium dioxide in some or all of the sugar syrup/sucrose ester layers. While in yet others, the hard panned coating does not comprise titanium dioxide in any layer.

One or more of the sugar syrup and/or sugar syrup/ sucrose esters layer(s) comprises a colorant, and in some embodiments, at least one of each does. In such embodiments, the $\Delta E$ of the color of the hard panned coating is less than 10, or less than 8, or less than 6, or even less than 4, when calculated relative to the same color of a hard panned coating comprising titanium dioxide. In these, or other, embodiments, the $\Delta E$ of the color of the hard panned coating is less than the $\Delta E$ of the same color of a hard panned coating having sucrose esters in all sugar syrup layers when both are calculated relative to the same color of a hard panned coating comprising titanium dioxide. In some embodiments, at least one of L*, a* and b* of at least one color variant of the hard panned coating is within 5% of the corresponding value of the same color variant of a hard panned coating comprising titanium dioxide.

The sugar syrup/sucrose ester layer(s) may underlie the sugar syrup layer(s), may alternate between sugar syrup layers, or may be provided in between sugar syrup layers. In some embodiments, the sugar syrup layer(s) is/are provided in between colored sugar syrup layers and uncolored sugar syrup layers.

Because such true colors are produced with the inventive hard panned coatings, they are advantageously used to coat confections, such as confections with fat based or other types of edible cores. In another aspect then, a hard panned confection is provided. The hard panned confection comprises an edible core and a hard panned coating wherein the hard panned coating comprises multiple sugar syrup layers; less than all of the sugar syrup layers further comprising an amount of one or more sucrose esters. The edible core may be a natural center, a confection, a grain-based item, or combinations of these. In some embodiments, the edible core comprises a natural center, a confection, or a grain-based item which is then coated with a confection.

Methods of providing the hard panned confections are also provided. The methods comprise applying at least one sugar syrup comprising one or more sucrose esters to provide at least one layer of the hard panned coating and applying at least one sugar syrup not comprising a sucrose ester to provide at least one layer of the hard panned coating. Each layer may be partially dried prior to application of the next. In some embodiments, one or more sugar syrups comprising the one or more sucrose esters are applied to a prepared surface of the edible core. In other embodiments, at least one sugar syrup comprising one or more sucrose esters and/or at least one sugar syrup not comprising the sucrose ester does not comprise titanium dioxide.

DETAILED DESCRIPTION

The present specification provides certain definitions and methods to better define the present invention and to guide those of ordinary skill in the art in the practice of the present invention. Provision, or lack of the provision, of a definition for a particular term or phrase is not meant to imply any particular importance, or lack thereof. Rather, and unless otherwise noted, terms are to be understood according to conventional usage by those of ordinary skill in the relevant art.

The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced item, and the terms "front", "back", "bottom", and/or "top", unless otherwise noted, are merely used for convenience of description, and are not limited to any one position or spatial orientation.

If ranges are disclosed, the endpoints of all ranges directed to the same component or property are inclusive and independently combinable (e.g., ranges of "up to 25 wt. %, or, more specifically, 5 wt. % to 20 wt. %," is inclusive of the endpoints and all intermediate values of the ranges of "5 wt. % to 25 wt. %," etc.). As used herein, percent (%) conversion is meant to indicate change in molar or mass flow of reactant in a reactor in ratio to the incoming flow, while percent (%) selectivity means the change in molar flow rate of product in a reactor in ratio to the change of molar flow rate of a reactant.

Reference throughout the specification to "one embodiment" or "an embodiment" means that a particular feature, structure, or characteristic described in connection with an embodiment is included in at least one embodiment. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

The present invention contemplates the possibility of omitting any components or steps listed herein. The present invention further contemplates the omission of any components or steps even though they are not expressly named as included or excluded from the invention.

As used herein, the phrase "sugar syrup" means a sugar water solution comprising at least a natural sugar and water. Other components may be present. The phrase "sugar syrup/sucrose ester syrup" means a sugar water solution comprising at least a natural sugar, one or more sucrose esters and water. Other components may be present. The components of one or more sugar syrup/sucrose ester syrup(s), other than the one or more sucrose ester(s) may be the same as the components of one or more sugar syrups, or may comprise more or less components.

"Hue" refers to the color property that gives a color its name, for example, red, orange-red, blue, violet, etc. "Chroma" is a color property indicating the purity of a color, where higher chroma is associated with greater purity of hue and less dilution by white, gray, or black. "Value" is a color property indicating the lightness or darkness of a color, where higher value is associated with greater lightness.

The terms "color" and "color characteristics" are used interchangeably, and encompass color properties such as hue, chroma, and value, and color model system parameters used to describe these properties, such as Commission Internationale de l'Eclairage CIE 1976 CIELAB color space $L^*a^*b^*$ values and CIELCH color space $L^*C^*h°$ values. The CIELAB and CIELCH color models provide more perceptually uniform color spaces than earlier color models. Colorants are analyzed with a spectrophotometer, and CIELAB $L^*a^*b^*$ and CIELCH $L^*C^*h°$ values are calculated from the spectral data. The $L^*a^*b^*$ and $L^*C^*h°$ values provide a means of representing color characteristics and assessing the magnitude of difference between two colors. The $L^*a^*b^*$ and $L^*C^*h°$ values reported herein were calculated based on spectral data obtained with a Konica Minolta Spectrophotometer CM-3500d operated in reflectance mode with a D65 illuminant and 10° observer angle.

There is provided a hard panned coating. The coating comprises multiple sugar syrup layers, only some of which further comprise one or more sucrose esters. It has now been surprisingly discovered that the use of sucrose esters in several layers of a hard panned coating can allow the replacement of the titanium dioxide conventionally included in some sugar syrup layers. It is even more surprising is that it is not necessary to use sucrose esters in all the layers of the hard panned coating to achieve superior results and in fact its use in fewer layers provide better results. This use of sucrose esters, i.e., as a titanium dioxide replacement in panned coatings, has not previously been appreciated in the art.

Also referred to as sucrose fatty acid esters, sucrose esters can be produced by the esterification of one or more of the hydroxyl groups of a sucrose molecule with a fatty acid. One or more hydroxyl groups of the sucrose molecule are replaced with a fatty acid chain. Commercially available sucrose fatty acid esters are generally mixtures of mono-, di-, and triesters, i.e., molecules with one, two, or three fatty acid moieties, respectively. The fatty acids may have chain lengths of six to twenty-two carbons. The structure of the resulting sucrose ester molecules gives them both a hydrophilic and a lipophilic character.

The degree of esterification and the chain lengths of the fatty acids on a sucrose fatty acid ester molecule determine its hydrophilic-lipophilic balance value, or HLB value. In general, the higher the degree of esterification and the longer the chain lengths of the fatty acids, the greater the lipophilic character of the sucrose ester molecule, and the lower the HLB value. The lower the degree of esterification and the shorter the chain lengths of the fatty acids, the greater the hydrophilic character of the molecule, and the higher the HLB value.

The HLB value of a sucrose ester or a mixture of sucrose esters, in turn, can assist in predicting its effectiveness as an emulsifier or stabilizer in a food system. A material with a low HLB value will tend to stabilize oil-in-water emulsions, while a material with a high HLB value will stabilize water-in-oil emulsions. The ability to tailor a mixture of sucrose fatty acid esters to target a specific HLB value range makes these materials especially useful as food-grade, non-ionic surfactants in food systems. Typical applications of sucrose esters in food systems include retaining moisture in baked goods, helping stabilize air in ice cream, etc.

Any known sucrose fatty acid ester may be used and many are known and suitable for use in food systems. Fatty acid esters having from 10 to 20 carbons, or from 14 to 18 carbon atoms, are suitable and examples of these include lauric acid, oleic acid, palmitic acid, stearic acid and myristic acid. Suitable sucrose fatty acid esters may have an HLB value of from 1 to 20, or from 2 to 18, or from 5 to 18, or from 6 to 16, and a monoester content of from 1% to 90%, or 5% to 85%, or 10% to 80%, or 15% to 75%.

The amount of the one or more sucrose esters to be used is limited only by practicality, e.g., enough should be used so that the desired benefit will be seen, but desirably, no greater amount will be used than that needed to achieve the same. Advantageously, small amounts, e.g., of as low as 0.05 wt. %, sucrose esters have found to be effective to provide at least some benefit. Amounts of at least 0.5 wt. %, or 0.4 wt. %, or 0.3 wt. %, or 0.2 wt. %, or 0.1 wt. %, or 0.05 wt. % are suitable. Amounts of more than 1 wt. %, or 2 wt. %, or 3 wt. %, or 4 wt. % or 5 wt. % may provide no further benefit, and so, are not used in some embodiments. In some embodiments, the sucrose ester(s) are provided in the sugar syrup in amounts of from 0.05 wt. % to 5 wt. %, or from 0.1 wt. % to 4 wt. %, or from 0.2 wt. % to 3 wt. % or from 0.3 wt. % to 4 wt. %, or from 0.4 wt. % to 5 wt. %. In some embodiments, the sucrose ester(s) is/are provided in the sugar syrup in amounts of from 0.5 wt. % to 1.0 wt. %.

Other than the sucrose esters, the remaining components of the sugar syrup may be the same, or different. Sugar syrups generally comprise one or more natural sugars and water. Although sugar alcohols and/or artificial sweeteners may be included in some embodiments, in others, they are desirably excluded.

Any natural sugar can be used in the sugar syrups, and suitable examples include sucrose, glucose, fructose, galactose, dextrose, and combinations of these. In some embodiments, the natural sugar desirably comprises sucrose.

The sugar syrups may contain at least 60 wt % sugar solids, or at least 65 wt % sugar solids, or at least 70 wt % sugar solids. The sugar syrup may contain less than 85 wt % sugar solids, or less than 80 wt % sugar solids. In some embodiments, the sugar syrup contains from 70 wt % to 80 wt % sugar solids. In embodiments using sucrose as the sole sugar in a sugar syrup, the sucrose sugar syrups may be at least 60° Brix, or at least 65° Brix, or at least 70° Brix. The sucrose sugar syrup may be less than 85° Brix, or less than 80° Brix. In some embodiments, the sucrose sugar syrup is from 70° Brix to 80° Brix.

At least some of the sugar syrups may also desirably comprise one or more colorants, and typically, outer layers of the sugar syrup do. Any desired colorant may be used, so long as the colorant is approved for use in food. Natural or synthetic colorants may be used. Artificial colors approved for use in food in the US and the European Union (EU designation in parentheses) include FD&C Blue No. 1 (Brilliant Blue FCF E133), FD&C Blue No. 2 (Indigotine E132), FD&C Green No. 3 (Fast Green FCF E143), FD&C Red No. 40 (Allura Red AC E129), FD&C Red No. 3 (Erythrosine E127), FD&C Yellow No. 5 (Tartrazine E102) and FD&C Yellow No. 6 (Sunset Yellow FCF E110). Some additional synthetic colorants approved for use in the European Union include Quinoline Yellow E104, Carmoisine E122, Ponceau 4R E124, Patent Blue V E131 and Green S E142. Useful food colorants that are often referred to as 'natural' are also known, such as, for example, caramel coloring (E150), annatto (E160b), Chlorophyllin (E140), Cochineal (E120), Betanin (E162), Turmeric (curcuminoids, E100), Saffron (carotenoids, E160a), paprika (E160c), Lycopene (E160d), and fruit and vegetable juices. Combinations of synthetic and/or natural colorants may be used, i.e., two or more synthetic colorants may be used, one or more natural colorants and one or more synthetic colorants, or two or more natural colorants are suitable.

Colorants are often available for use in food as either dyes or lakes. Dyes are soluble in water, but insoluble in oil, and provide color via dissolution in a food matrix. Lakes, on the other hand, are soluble in neither oil nor water, and provide color via dispersion in a food matrix, such as that provided by the sugar syrup.

Suitable concentrations of natural colorants can range from 0.01 wt. % to 20 wt. %, or from 0.05 wt. % to 15 wt. %, or from 0.1 wt. % to 10 wt. %, while suitable concentrations of synthetic colorants can range from 0.01 wt. % to 5.0 wt. %, or from 0.5 wt. % to 4.0 wt. %, or from 0.1 wt. % to 3.0 wt. %.

In some embodiments, in particular those wherein the panned coating is white or a pastel color, titanium dioxide may be included in some sugar syrups used in, or layers of, the coating. In such embodiments, titanium dioxide may desirably be included as a colorant in some, but not all, of the sugar syrups also comprising a different colorant, and in such syrups, may desirably be included in any amount that provides the desired final color to the panned coating.

Desirably, the sugar syrup/sucrose ester layers may advantageously not include substantial amounts of, or any, titanium dioxide ($TiO_2$). That is, the sucrose ester(s) may act as a replacement for any titanium dioxide that may otherwise have been conventionally included in the sugar syrup, although lesser amounts of the sucrose esters are required to provide similar opacity/results. For example, sucrose ester amounts of less than 2.5 wt. %, or less than 2.0 wt. %, or less than 1.5 wt. %, or less than 1.0 wt. % are expected to provide similar results to amounts of titanium dioxide of 2.5 wt. % or more. In some embodiments, the sucrose ester(s) is/are provided in the sugar syrup in amounts of from 0.5 wt. % to 1.0 wt. %

The sugar syrups may also optionally include other components conventionally used in hard panned coatings. Many such components are known in the art and include, but are not limited to, polyols, natural polymers, stabilizers, flavors, sensates, emulsifiers, gums, vitamins, minerals, nutraceuticals, stabilizers, or combinations of these. Gums, such as gum arabic, may be included in layers applied directly to an edible core to fill irregularities to provide a smoother surface for later applied sugar syrups, to provide a substrate that improves adhesion of the subsequent sugar syrup layers, or to create a barrier to oil, moisture, etc. Gums may also be included in intermediate and/or outer sugar syrup layers in order to plasticize the hardened coating.

If natural colorants are used, it may be desirable to adjust the pH of the sugar syrup comprising the natural colorant so that the desired color can be seen. For example, as disclosed in U.S. Pat. No. 6,939,572, anthocyanins are more stable, and produce a truer blue color when solutions comprising the same have their pH adjusted to be between 7 and 9. If such a pH adjustment is desired or required, it may be accomplished via addition of any appropriate pH adjusting solution, e.g., sodium hydroxide. U.S. Pat. No. 6,939,572 is hereby incorporated by reference herein in its entirety for any and all purposes.

Any combination of sugar syrups, having any number of formulations, may be applied in any order to provide the hard panned coating. That is, so long as at least one layer of the hard panned coating does, and at least one layer does not, comprise one or more sucrose ester(s), cost savings will be provided by the exclusion thereof from that at least one layer. And yet, the same or even greater advantages may be seen than are seen in hard panned coatings comprising sucrose ester(s) in every layer of the hard panned coating.

Prior to the application of one or more sugar syrup layers, the surface of the edible core may be prepared according to known techniques in the art such as gumming, isolating, and stabilizing. For example, in gumming, layers of a high glucose content syrup containing a gum, gelatin, starch, or dextrin may be applied directly to the edible core alternately with a fine crystalline sugar to fill irregularities and smooth ridges. The smoother surface that is obtained may facilitate even coating and adherence of the later applied sugar syrup layers. Isolating is a process of creating a barrier to lipid, water, or natural sugar migration between the edible core and the sugar syrup layers, and may be effected by applying a film containing gelatin or gum to the core in a process similar to gumming Stabilizing may be required to strengthen a fragile edible core for subsequent hard pan coating with sugar syrups. A cookie core, for example, may be prevented from crumbling during hard pan coating by first being coated with a melted fat, then isolated with a gum-containing film. Preparation of the surface of the edible core may also be completed with one or more applications of a sucrose sugar syrup.

In some embodiments, sugar syrups may be applied as coating layers directly to the surface of an edible core. In other embodiments, sugar syrups may be applied as coating layers to a prepared surface of an edible core, wherein the surface has been prepared according to a known technique including, but not limited to, gumming, isolating, and stabilizing. In still other embodiments, sugar syrups may be applied as coating layers to a crystallized sugar syrup layer overlying any number of coating layers overlying the edible core. As the phrase that follows in quotation marks is used herein, the application of a sugar syrup as a coating layer "to an edible core" does not necessarily denote that the sugar syrup is applied directly to the edible core. Rather, a sugar syrup that is applied as a coating layer "to an edible core" may be applied directly to the surface of the edible core, or to a prepared surface of an edible core, or to a crystallized sugar syrup layer overlying any number of coating layers overlying the edible core, within the meaning of the phrase.

These layers may be formed from sugar syrups comprising or not comprising the sucrose esters, and may comprise colorant or be uncolored. In some embodiments, multiple layers of sugar syrup not comprising sucrose esters or colorant, and thereafter, multiple layers of sugar syrup comprising sucrose esters and no colorant, are applied to the core or a prepared surface of the core. In such embodiments, additional layers of sugar syrup comprising one or more colorants and with or without sucrose esters are applied over the sugar syrup/sucrose ester/no colorant layers.

Typically, fewer than 30, or fewer than 25, or fewer than 20, or fewer than 15 sugar syrup/sucrose ester(s) layers may be provided in the hard panned coatings. These layers may be alternated between layers provided by coating with sugar syrups not comprising sucrose ester(s), and in some embodiments, may be provided between sugar syrup layers not comprising the one or more sucrose esters.

Sugar syrups comprising colorant may be applied overlying the sugar syrup/sucrose ester layers, and in such embodiments, the number of layers applied may be fewer than 40, or fewer than 30, or fewer than 25, or fewer than 20, colored sugar syrup layers overlying the sugar syrup/sucrose ester layers.

Once hardened, the panned coating may be expected to have a thickness of no more than 3.0 mm, or no more than 2.5 mm, or no more than 2.0 mm, or no more than 1.5 mm, or no more than 1.0 mm. The hard panned coating may also have a thickness of greater than 0.1 mm or greater than 0.2 mm, or greater than 0.3 mm, or greater than 0.4 mm, or greater than 0.5 mm. In some embodiments, the hard panned coating may have a thickness of from 0.1 mm to 3.0 mm, or from 0.2 mm to 2.5 mm, or from 0.3 mm to 2.0 mm, or from 0.4 mm to 1.5 mm, or from 0.5 mm to 1.0 mm.

The hard panned coatings provided herein provide colors that closely approximate the same color coated using conventional formulations for hard panned coatings, i.e., comprising one or more other opacifiers, as can be seen via evaluation of CIELAB L*a*b* and CIELCH L*C*h° values calculated from spectral measurements. The L*a*b* and L*C*h° values provide a means of representing color characteristics and assessing the magnitude of difference between two colors.

L*a*b* values consist of a set of coordinate values defined in a three-dimensional Cartesian coordinate system. L* is the value, or lightness, coordinate. L* provides a scale of lightness from black (0 L* units) to white (100 L* units) on a vertical axis. a* and b* are coordinates related to both hue and chroma. a* provides a scale for greenness (−a* units) to redness (+a* units), with neutral at the center point (0 a* units), on a horizontal axis. b* provides a scale for blueness (−b* units) to yellowness (+b* units), with neutral at the center point (0 b* units), on a second horizontal axis perpendicular to the first horizontal axis. The three axes cross where L* has a value of 50 and a* and b* are both zero.

L*C*h° values consist of a set of coordinate values defined in a three-dimensional cylindrical coordinate system. L* is the value, or lightness, coordinate. L* provides a scale of lightness from black (0 L* units) to white (100 L* units) on a longitudinal axis. h° is the hue coordinate. h° is specified as an angle from 0° to 360° moving counterclockwise around the L* axis. Pure red has a hue angle of 0°, pure yellow has a hue angle of 90°, pure green has a hue angle of 180°, and pure blue has a hue angle of 270°. The C* coordinate represents chroma and is specified as a radial distance from the L* axis. C* provides a scale from achromatic, i.e., neutral white, gray, or black, at the L* axis (0 C* units) to greater purity of hue as the coordinate moves away from the L* axis (up to 100 or more C* units). C* and h° can be calculated from a* and b* using Equations 1 and 2:

$$C^* = \left(a^{*2} + b^{*2}\right)^{0.5} \tag{1}$$

$$h° = \arctan\left(\frac{b^*}{a^*}\right) \tag{2}$$

"Delta E," "$\Delta E_{ab}$," or more simply, "$\Delta E$," is a measure of the magnitude of total color difference between two colors represented in CIELAB L*a*b* color space. The $\Delta E$ of two different colors with L*a*b* values, $L^*_1 a^*_1 b^*_1$ and $L^*_2 a^*_2 b^*_2$, is calculated using Equation 3:

$$\Delta E = \Delta E^*_{ab} = \sqrt{(L^*_2 - L^*_1)^2 + (a^*_2 - a^*_1)^2 + (b^*_2 - b^*_1)^2} \tag{3}$$

It has been reported that an experienced color observer cannot distinguish any difference between two colors when the $\Delta E$ is about 2.3 or less. However, it is often seen that laypeople may not discern any difference between two colors even when the $\Delta E$ is greater than 2.3, for example, at a $\Delta E$ of 4, 6, 8, or 10.

The inventive panned coatings exhibit $\Delta E$'s of 10 or less as compared to conventional panned coatings (i.e., comprising titanium dioxide in one or more layers) of the same color. Surprisingly, the use of sucrose esters in all layers of a panned coating does not provide an improvement in the $\Delta E$ compared to a conventional panned coating, i.e., a $\Delta E$ of less than the $\Delta E$ of the same colored coating, wherein sucrose esters are used in only some layers of the coating, when both are calculated relative to a conventional, titanium dioxide containing hard panned coating. That is, less of a color difference is seen between a conventional coating and some sucrose esters containing layers than is seen between the same conventional coating and sucrose esters in all layers of a hard panned coating.

Further surprising is the fact that other emulsifiers approved for use in food, when incorporated into a hard panned coating, do not provide ΔE's comparable to sucrose esters when both are compared to conventional panned coatings (i.e., comprising titanium dioxide in one or more layers) of the same color, but instead produce larger ΔE's. Indeed, the use of these other emulsifiers, Polysorbate 60, Polysorbate 80, Sorbitan 80 or Span 60, can impart undesirable sensory attributes to the panned coating, and so, in some embodiments, the panned coatings of the present invention do not comprise any other emulsifier(s).

The hard panned coating may be applied to any desired edible core. In some embodiments, the edible core may comprise a natural center, such as a nut, groundnut, nut meat, nut paste, dried or infused fruit piece, or dried fruit paste. Or, the edible core may comprise a confection, such as a boiled sugar syrup, caramel, nougat, taffy, toffee, fondant, chocolate, confectionery coating, or combinations of these. Alternatively, the edible core may comprise a grain-based item, such as a cookie, pretzel, biscuit, wafer, cracker, or other baked, crisped, or puffed material. In some embodiments, the edible core may comprise a natural center, confection, or grain-based item which is then coated with a confection.

The coating is applied to the desired edible core according to conventional processes known in the art. Such processes are described, for example, in "Sugar Confectionery and Chocolate Manufacture, R. Lees and E. B. Jackson, Chemical Publishing Company, Feb. 7, 1975, and "Industrial Chocolate Manufacture and Use," editor, S. T. Beckett, Blackie & Son Ltd., Glasgow, 1988, each hereby incorporated herein by reference in its entirety for any and all purposes.

Panning processes may typically be driven by the equipment utilized to perform them, which can be dry equipment or slurry equipment, both types being commercially available from, e.g., Ets Dumoulin & Cie, Tournan-en Brie, France, KOCO Food Tech, Inc., Phoenix, Md. and Loynds International, Ltd., Poulton Le Fylde, England.

Panning is contrasted herein from film coating, i.e., the coatings are applied by a panning process and not a film coating process. While both are industrial processes for preparing coated edible products, such as confections and pharmaceuticals, they are very different processes that make use of very different coating formulations.

Typically, the term "panning" means the iterative application of sugar-based coatings, such as, e.g., sucrose or dextrose, to masses of edible to produce coated products. In a panning process, multiple applications of a highly concentrated sugar syrup are used to build up the uncolored portion of a sugar shell. This is followed by multiple applications of a concentrated sugar syrup containing colorant. The panning process comprises the repetitive application of thin layers of a coating solution or composition onto an intermixed mass of centers, while mixing the mass of centers, and the drying of each layer of coating solution or composition during which the sugar in the coating crystallizes between the application of layers.

In contrast, the phrase "film coating" means the application of non-sugar based coatings to masses of centers, wherein the coating material typically comprises film forming components, such as a modified cellulose, e.g., hydroxypropyl-methylcellulose that is continuously applied to the centers until the desired coating thickness is achieved. Because the film coating process does not require the crystallization of a sugar shell, film coating is a continuous process, typically comprising the simultaneous application of a coating solution, distribution by mixing, and drying of the coating solution. That is, the film coating sprayers are not turned off during the film coating process, but, instead, are run continuously until the desired thickness of film coating is applied. The film coating solutions typically contain less than about 10 percent solids, as higher concentrations would be too viscous to spray.

In short, conventional film coatings typically do not comprise sugar, or at least are not sugar-based, and conventional panned coatings do not comprise film forming components, nor do the panned coatings of the present invention.

Some embodiments of the invention will now be described in detail in the following examples.

Example 1—Comparison of Inventive Coatings with Conventional Coatings (Comprising TiO2) and Coatings not Comprising Sucrose Esters or Titanium Dioxide Several different coating formulations are prepared and coated onto edible confection cores according to a conventional process. More specifically, each tested confection has 22 total layers of 74° Brix sugar (sucrose) syrup applied, the first 5 being applied being the particular coating formulation being tested. The remaining 17 sugar syrup layers contain one or more FD&C synthetic colorants.

The coating formulations used are as follows:
"TiO$_2$" samples: 74° Brix sugar (sucrose) syrup with 2.5 wt. % titanium dioxide
"No TiO2" samples: 74° Brix sugar (sucrose) syrup
"SE" samples: 74° Brix sugar (sucrose) syrup with 0.5 wt. % Sucrose Ester SP50 (Sisterna B.V., Roosendaal, The Netherlands)

Color characterization is performed on ten coated confections of each tested color to determine the L*, a* and b* values. The averages for each set of ten confections are shown in Table 1.

The abbreviation "SE" means "sucrose ester" and samples identified with the SE abbreviation comprise the same. Each ΔE and absolute % difference ("|% diff|") is calculated relative to the TiO$_2$-containing sample of the same color. A ΔE value of 2.3 or less is generally considered to be the value at which an experienced observer would find the color of a sample to be indistinguishable from the color of the control. However, a layperson may not be able to distinguish the color of a sample from the color of the control until a ΔE greater than 2.3 is seen, for example, a ΔE of 4, 6, 8, or 10.

TABLE 1

| SAMPLE | L* | a* | b* | ΔE | \|% diff L*\| | \|% diff a*\| | \|% diff b*\| |
|---|---|---|---|---|---|---|---|
| Orange TiO$_2$ | 58.66 | 52.38 | 53.61 | — | — | — | — |
| Orange No TiO$_2$ | 54.57 | 53.11 | 51.45 | 4.68 | 6.97 | 4.03 | 4.03 |
| Orange SE | 58.85 | 52.57 | 55.88 | 2.29 | 0.32 | 0.36 | 4.23 |
| Yellow TiO$_2$ | 80.36 | 7.63 | 85.07 | — | — | — | — |
| Yellow No TiO$_2$ | 78.41 | 6.61 | 78.12 | 7.29 | 2.43 | 13.37 | 8.17 |
| Yellow SE | 79.25 | 7.68 | 83.61 | 1.83 | 1.38 | 0.66 | 1.72 |
| Green TiO$_2$ | 55.96 | −43.30 | 40.92 | — | — | — | — |
| Green No TiO$_2$ | 61.50 | −37.80 | 36.87 | 8.79 | 9.90 | 12.70 | 9.90 |

TABLE 1-continued

| SAMPLE | L* | a* | b* | ΔE | \|% diff L*\| | \|% diff a*\| | \|% diff b*\| |
|---|---|---|---|---|---|---|---|
| Green SE | 55.94 | −43.43 | 40.54 | 0.40 | 0.04 | 0.30 | 0.93 |
| Blue TiO$_2$ | 48.10 | −26.12 | −34.36 | — | — | — | — |
| Blue No TiO$_2$ | 53.92 | −25.58 | −29.75 | 7.44 | 12.10 | 2.07 | 13.42 |
| Blue SE | 47.38 | −25.54 | −33.20 | 1.48 | 1.50 | 2.22 | 3.38 |
| Red TiO$_2$ | 36.64 | 40.60 | 20.02 | — | — | — | — |
| Red No TiO$_2$ | 37.96 | 39.85 | 20.49 | 1.59 | 3.60 | 1.85 | 2.35 |
| Red SE | 35.23 | 38.57 | 17.65 | 3.42 | 3.85 | 5.00 | 11.84 |
| Brown TiO$_2$ | 28.25 | 8.29 | 6.13 | — | — | — | — |
| Brown No TiO$_2$ | 34.38 | 13.17 | 12.16 | 9.89 | 21.70 | 58.87 | 98.37 |
| Brown SE | 28.40 | 9.14 | 6.53 | 0.95 | 0.53 | 10.25 | 6.53 |

As is shown, for each color variant, the inventive SE sample, comprising the sucrose ester in the first 5 layers of the coating, closely approximates the color provided by the conventional sample, i.e., comprising TiO$_2$ in the first 5 layers of the coating. That is, for each color variant, the ΔE calculated between the inventive sample and conventional sample is 4 or less, in some instances is 3 or less, in some instances is 2 or less, and for some colors, is even 1 or less. Furthermore, for many color variants, the absolute percent difference between at least one of the L*, a*, and b* coordinates is less than 10%, and in many instances is less than 5%.

For all color variants but red, the ΔE between the inventive and conventional sample is less than that provided between the conventional sample and the sample not comprising either the sucrose ester(s) or TiO$_2$. This is also true for the absolute percent difference between at least one of the L*, a*, and b* coordinates between the inventive and conventional samples as compared to the percent difference between the conventional sample and the samples not comprising the sucrose ester(s) or titanium dioxide. For example, the absolute percent difference between the L* and a* coordinates is less between the orange SE sample and the orange TiO$_2$ sample (0.32 and 0.36, respectively) than between the orange TiO$_2$ sample and the orange no TiO$_2$ sample (6.97 and 1.39, respectively). For each of the L*, a*, and b* coordinates of the yellow and green samples, the SE samples have a lesser percent difference between the corresponding coordinate of the TiO$_2$ sample than that between the TiO$_2$ sample and non-TiO$_2$ sample.

Example 2—Comparison of Sucrose Esters in Less than all Coating Layers, to Sucrose Esters, and Other Emulsifiers, in all Coating Layers of Uncolored Samples Coating formulations having 0.5 wt. % sucrose esters, Polysorbate 60, Sorbitan 80, Polysorbate 80 or Span 60 in 74° Brix sugar (sucrose) syrup are prepared and used to coat edible cores. A control coating formulation comprising 2.5 wt. % titanium dioxide in 74° Brix sugar (sucrose) syrup, and a "blank" coating of uncolored 74° Brix sugar syrup are also prepared. The control and sucrose ester formulations are coated as the first 5 layers over the core, with 17 layers of the blank syrup coated thereupon. For other samples, the sucrose ester formulation and other emulsifier formulations are coated on the confection for all 22 layers.

Color characterization is performed for ten coated confections from each trial to determine the L*, a* and b* values, and the averages for each set of ten confections are shown in Table 2. The samples are also subjected to sensory evaluation.

TABLE 2

| SAMPLE | L* | a* | b* | ΔE | \|% diff L*\| | \|% diff a*\| | \|% diff b*\| |
|---|---|---|---|---|---|---|---|
| Control[1] | 86.59 | −0.30 | 0.62 | — | — | — | — |
| SE 1[2] | 86.76 | −0.16 | 1.61 | 1.01 | 0.20 | 46.67 | 159.68 |
| SE 2[3] | 89.23 | −0.29 | 1.14 | 2.69 | 3.05 | 3.33 | 83.87 |
| Polysorbate 60[4] | 92.76 | −0.31 | 1.71 | 6.27 | 7.13 | 3.33 | 175.81 |
| Sorbitan 80[4] | 91.85 | −0.26 | 1.45 | 5.33 | 6.07 | 13.33 | 133.87 |
| Polysorbate 80[4] | 89.61 | −0.32 | 0.72 | 3.02 | 3.49 | 6.67 | 16.13 |
| Span 60[4] | 91.45 | −0.21 | 1.24 | 4.90 | 5.61 | 30.00 | 100.00 |

[1] 2.5 wt % TiO$_2$ in uncolored sugar syrup in first 5 layers, uncolored sugar syrup in last 17 layers
[2] 0.5 wt % sucrose ester SP 50 in uncolored sugar syrup in first 5 layers, uncolored sugar syrup in last 17 layers
[3] 0.5 wt. % sucrose ester SP 50 in uncolored sugar syrup in all 22 layers
[4] 0.5 wt % emulsifier in uncolored sugar syrup in all 22 layers As shown in Table 2, using sucrose esters in only some layers of the panned coating gives the smallest ΔE when calculated relative to the TiO$_2$ control. Surprisingly, using sucrose esters in all layers of the panned coating provided a greater ΔE than the ΔE of sucrose esters in only some layers, when both are calculated relative to the titanium dioxide control. Further surprising is the fact that no other emulsifier, even when used in all layers, is as effective as the use of sucrose esters in some layers, i.e., every other emulsifier sample resulted in a greater ΔE than the ΔE provided by sucrose esters in less than all coating layers, when calculated relative to the TiO$_2$ control.

Sensory testing of these samples is also conducted and no taste or texture difference is perceived between either of the sucrose ester samples and the control, TiO$_2$ sample. However, every other emulsifier tested results in the coated core having a bitter taste as well as unpleasant retronasal odorants, i.e., odorants that travel through the mouth to stimulate olfactory receptors within the olfactory bulb.

Example 3—Shelf Stability of Hard Panned Coatings Comprising Sucrose Esters

Yellow and brown colored hard panned confections are prepared according to a conventional process, with inventive samples comprising 0.5 wt. % sucrose esters in 74° Brix sugar (sucrose) syrup in the first 5 coating layers, and control samples comprising 2.5 wt. % titanium dioxide in 74° Brix sugar (sucrose) syrup in the first 5 coat layers. The formulations are otherwise identical, comprising FD&C synthetic colorants in 74° Brix sugar (sucrose) syrup in 17 colorant layers overlying the inventive or control layers.

The coated confections are stored in closed containers at 20° C. and evaluated by a trained sensory panel using descriptive analysis at 4, 6, 23 and 47 weeks. The results of these evaluations provided no indication that replacement of titanium dioxide with sucrose esters alters the flavor, basic taste or texture of the panned confections. Further, no evidence of early crystallization of the coating or atypical aging of the panned confections is seen with the coatings comprising sucrose esters as compared to the conventional coatings comprising titanium dioxide. It can thus be concluded that the addition of sucrose esters to the hard panned coating does not introduce stability concerns to the panned confections that are not seen in conventional panned confections.

Example 4—Comparison of Sucrose Esters in Less than all Coating Layers, to Sucrose Esters in all Coating Layers of Colored Samples Red colored hard panned confections are prepared according to a conventional process. For a control sample, a conventional coating formulation is prepared having 2.5 wt. % titanium dioxide in 74° Brix sugar (sucrose) syrup and coated as five precoat layers on the confection. For an inventive sample, an inventive coating formulation is prepared containing the sucrose esters at 0.5 wt. %, and no titanium dioxide, in 74° Brix sugar (sucrose) syrup and coated as five precoat layers on the confection. For both the control and inventive samples, a colored coating formulation containing a red FD&C synthetic colorant in 74° Brix sugar (sucrose) syrup is coated over the 5 initial control or inventive layers in seventeen layers. A comparative sample is produced by coating the inventive coating formulation as five precoat layers on the confection, then applying seventeen overcoat layers of a second colored coating formulation containing the red FD&C synthetic colorant and the sucrose esters at 0.5 wt. % in 74° Brix sugar (sucrose) syrup. That is, the inventive panned coating comprises sucrose esters in less than all layers of the coating and the comparative panned coating comprises sucrose esters in all layers of the coating.

Color characterization is performed for ten coated confections from each trial to determine the L*, a* and b* values, and the averages for each set of ten confections are shown in Table 4.

TABLE 4

| SAMPLE | L* | a* | b* | ΔE |
|---|---|---|---|---|
| Red TiO$_2$ | 36.64 | 40.60 | 20.02 | — |
| Red SE in 5 layers | 35.23 | 38.57 | 17.65 | 3.42 |
| Red SE in all layers | 42.98 | 38.95 | 18.97 | 6.63 |

As shown, the sample wherein all the layers of the coating comprised sucrose esters has a greater color difference from the titanium dioxide containing control than when only the first 5 layers comprised the sucrose esters. That is, this sample has a greater ΔE than the sample including sucrose esters in less than all layers of the panned coating. This example thus shows that for colored samples, as for uncolored samples, the use of sucrose esters in less than all layers of the panned coating not only provides cost savings in the form of lower material costs for the sucrose esters, but also, actually provides a panned coating having a color less distinguishable from a conventional coating of the same color than a coating comprising sucrose esters in all layers.

The invention claimed is:

1. A hard panned coating comprising multiple sugar syrup layers,
   wherein at least one sugar syrup layer comprises one or more sucrose esters,
   wherein at least one sugar syrup layer does not comprise one or more sucrose esters, and
   wherein the at least one sugar syrup layer not comprising sucrose ester further comprises a colorant.

2. The hard panned coating of claim 1, wherein the sugar comprises a natural sugar.

3. The hard panned coating of claim 2, wherein the sugar is selected from the group consisting of sucrose, glucose, fructose, galactose, dextrose, and combinations thereof.

4. The hard panned coating of claim 1, wherein the sugar syrup layers do not contain titanium dioxide.

5. The hard panned coating of claim 1, wherein ΔE denotes a CIELAB color difference and the ΔE of the color of the hard panned coating is 10 or less when calculated relative to the color of the same color variant of a hard panned coating comprising titanium dioxide.

6. The hard panned coating of claim 5, wherein the ΔE of the color of the hard panned coating is 6 or less when calculated relative to the color of the same color variant of a hard panned coating comprising titanium dioxide.

7. The hard panned coating of claim 1, wherein ΔE denotes a CIELAB color difference and the ΔE of the color of the hard panned coating is less than the ΔE of the color of the same color variant of a hard panned coating having sucrose esters in all sugar syrup layers when both are calculated relative to the color of the same color variant of a hard panned coating comprising titanium dioxide.

8. The hard panned coating of claim 1, wherein at least one of a CIELAB L*, a*, and b* values of the color of at least one color variant of the hard panned coating is within 5% of the corresponding value of the color of the same color variant of a hard panned coating comprising titanium dioxide.

9. The hard panned coating of claim 1, wherein the sugar syrup/sucrose ester layer(s) underlie the sugar syrup layer(s).

10. A hard panned confection comprising an edible core coated with the hard panned coating of claim 1.

11. The hard panned confection of claim 10, wherein the edible core comprises one or more of a natural center, a confection, a grain-based item, and combinations thereof.

12. A hard panned confection, comprising an edible core and a hard panned coating,
   wherein the hard panned coating comprises multiple sugar syrup layers,
   wherein at least one sugar syrup layers comprises one or more sucrose esters, and
   wherein at least one sugar syrup layer does not comprise one or more sucrose esters.

* * * * *